(12) United States Patent
Faillance

(10) Patent No.: US 7,099,710 B1
(45) Date of Patent: Aug. 29, 2006

(54) PORTABLE TELEPHONE CASE

(76) Inventor: Gabriel Faillance, 8240 NW. 30th Ter., Miami, FL (US) 33122

( * ) Notice: Subject to any disclaimer, the term of this patent is extended or adjusted under 35 U.S.C. 154(b) by 452 days.

(21) Appl. No.: 10/337,223

(22) Filed: Jan. 6, 2003

(51) Int. Cl.
*H04M 1/00* (2006.01)

(52) U.S. Cl. ............................... 455/575.8; 455/575.1; 455/575.3

(58) Field of Classification Search ............. 455/575.8, 455/575.3, 575.1, 550.1, 569.1, 90.1; 379/455, 379/450, 454; 340/7.63; 224/929, 930, 224/666, 676, 672, 270, 667, 152, 578
See application file for complete search history.

(56) References Cited

U.S. PATENT DOCUMENTS

| | | | | |
|---|---|---|---|---|
| 1,479,008 | A | * | 1/1924 | Powers ........................ 224/152 |
| 5,363,089 | A | * | 11/1994 | Goldenberg ................ 340/7.63 |
| 5,697,538 | A | * | 12/1997 | Goldenberg et al. ......... 224/676 |
| 6,115,620 | A | * | 9/2000 | Colonna et al. .......... 455/569.1 |
| 6,729,518 | B1 | * | 5/2004 | Badillo et al. ................ 224/578 |
| 2002/0139822 | A1 | * | 10/2002 | Infanti ......................... 224/197 |
| 2003/0064751 | A1 | * | 4/2003 | Charlier et al. ............. 455/557 |
| 2004/0203486 | A1 | * | 10/2004 | Shepherd et al. ........... 455/90.1 |

* cited by examiner

*Primary Examiner*—Matthew D. Anderson
*Assistant Examiner*—Lewis West
(74) *Attorney, Agent, or Firm*—Malloy & Malloy, P.A.

(57) ABSTRACT

A portable telephone case structured to retain at least a portion of a portable telephone on an interior thereof and including a housing having a display portion disposed and structured to permit viewing of a display face of the telephone within the case, while the case is secured to the person of a user. A cover panel is movably secured to the housing and selectively disposable between a closed orientation, in covering relation to the display portion, and an open orientation, wherein the housing and the cover panel are separated, thereby allowing the display face of the telephone to be viewed through the display portion of the case without disconnecting the case or removing the telephone from their secured position on the user.

19 Claims, 2 Drawing Sheets

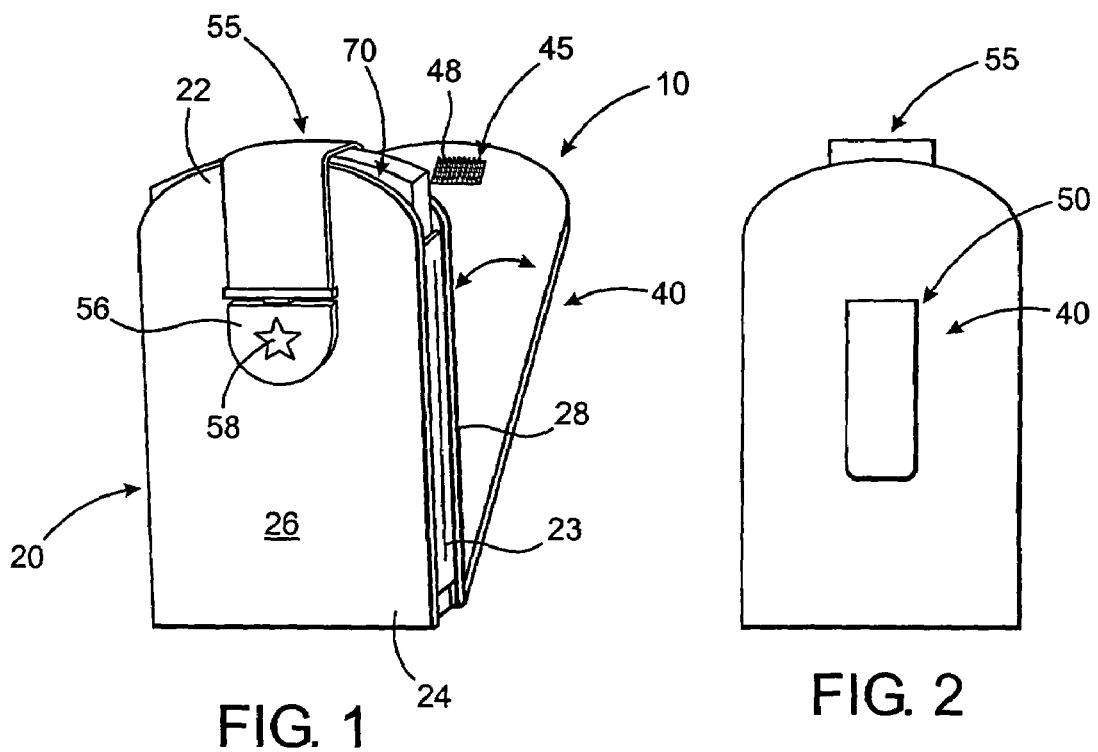
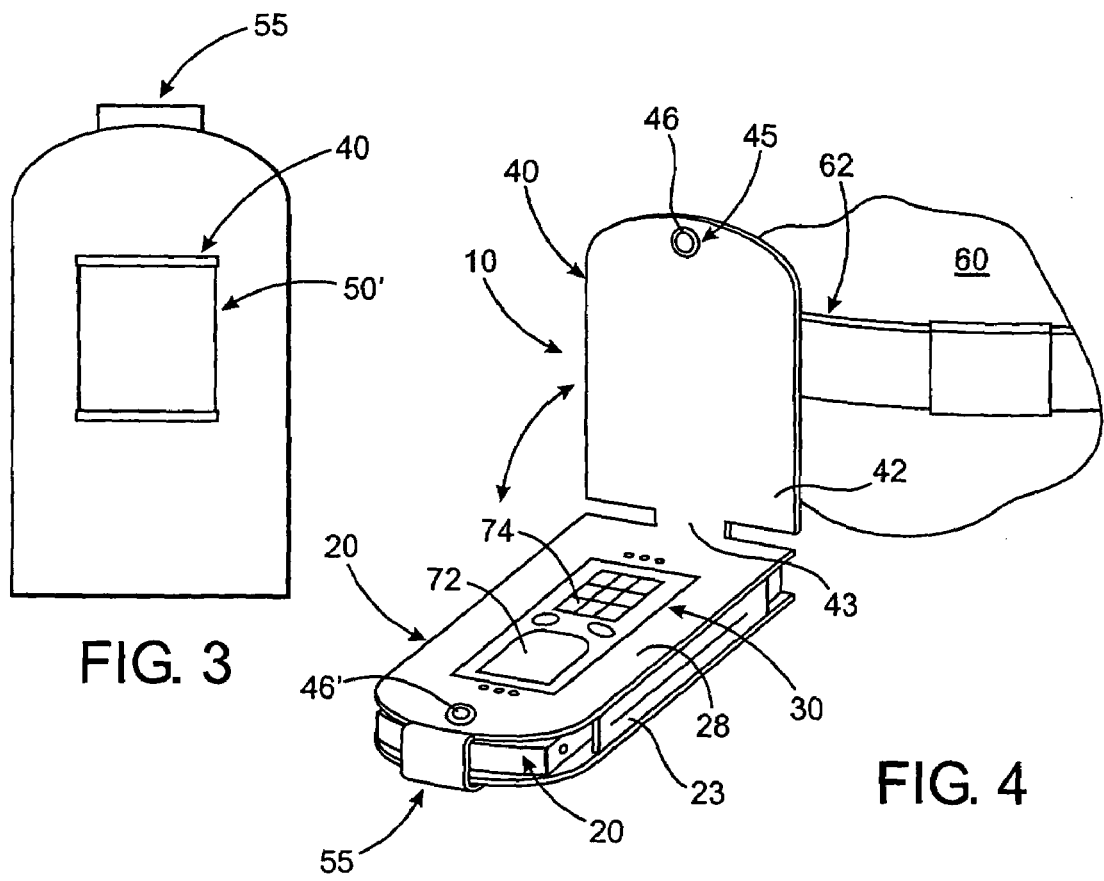

PORTABLE TELEPHONE CASE

BACKGROUND OF THE INVENTION

1. Field of the Invention

The present invention relates to a portable telephone case of the type structured to hold and contain a portable telephone, such as a compact cellular telephone and achieve effective and convenient securement thereof to the person of a user, such as by being clipped to a belt, chain or other portion of the user's person. Moreover, the portable telephone case of the present invention is configured to provide for substantially rapid and convenient access to the display of the portable telephone without requiring removal of the portable telephone case from its secured position on the user. The user is thereby allowed to monitor incoming messages and telephone calls without the need to continuously remove and re-secure the portable telephone.

2. Description of the Related Art

Use of portable telephones and in particular cellular telephones is prevalent in all aspects of society and is a virtual necessity in almost all business and personal environments. The wide spread use of portable cellular telephones has served to increase technological advancements and capabilities thereof including, but not limited to, their compact size. Certainly, a primary reason for their compact nature is to facilitate their carriage and possession without significant inconvenience to the user. Users are thereby able to mount or position their portable telephones in a variety of different and comfortable locations as it suits their needs.

One primarily preferred means of holding a portable telephone is through the use of a clip or other type of securement mechanism that effectively secures the portable telephone to the person of the user, such as to their belt or other article of clothing. Accordingly, many portable telephones come with a pre-positioned belt clip type of structure on the rear of the telephone, thereby allowing the telephone to be effeectively secured by the user when not in use. As many models of cellular telephones do not necessarily include exteriorly mounted securement structures, and for various other reasons such as design, comfort and/or protection of the portable telephone, portable telephone cases have also become prevalent in the industry. These cases are structured to effectively and removably secure the portable telephone to the user.

Traditionally, portable telephone cases are generally small and compact and are configured to snugly and securely contain the portable telephone on an interior portion thereof, while permitting visibility and actuation of the appropriate display face of the cellular telephone. In particular, most portable telephones include a primary display face on which control or function buttons, such as the number dialing buttons, answer buttons, etc. are positioned. Typically, the display structure provides a visual indication of a variety of information, such as the time of day, caller I.D. information, text messages information, etc. for the user. In addition to the protective aspect of the portable telephone cases presently available, the need to provide a means of securement to the user have also been addressed. Essentially, however, existing portable telephone cases merely replicate the securement structures and configurations that are conventionally available by including a fastening element, such as the clip or other element on the rear of the case, leaving a front of the case open to expose the display and function buttons of the portable telephone.

One primary inconvenience associated with the presently available telephone cases and the clipping type structures relates to the inconveniences associated with the repeated use of the telephone during incoming and/or outgoing calls. For example, a common occurrence is for a user to receive a telephone call, and look at the display of the telephone so as to identify the caller and thereafter determine whether they will actually take the telephone call. In order to do this utilizing currently available structures, when the telephone call is received, a user must unclip the portable telephone case, properly orient the portable telephone and observe the display. If the caller does not wish to take the telephone call, the user must then re-secure the portable telephone and the case as desired. While this may be a seemingly simple task, having to perform it on repeated occasions can certainly become an inconvenience especially if the user is in a seated location which can make it difficult to remove and/or re-secure the portable telephone.

As a result, it would be highly beneficial to provide a portable telephone case which not only provides a protective covering and an effective means of securing the portable telephone to the user, but which does so in a manner which effectively allows the user to quickly and conveniently monitor the display of the portable telephone without requiring removal of the portable telephone from its secured location. Moreover, such a portable telephone case should provide convenient and easily visible access to the display of the portable telephone in an orientation of the telephone and/or casing which is easily obtainable.

SUMMARY OF THE INVENTION

The present invention relates to a portable telephone case which will be structured to house and protect a portable telephone, such as a compact cellular telephone. In particular, the portable telephone case includes a housing. The housing is structured to contain the portable telephone at least partially therein, thereby holding and protectively shrouding at least a portion of the telephone that is contained. Additionally, the housing contains a display portion. The display portion is structured to provide visible access to a display of the portable telephone while disposed in the housing, as well as facilitate the manipulation of any buttons controlling the function, activation, etc. of the portable telephone.

The portable telephone case of the present invention, as mentioned further, includes a clip. More specifically, the clip is structured to be secured to a user and, as will be described, to thereby secure the housing and the portable telephone contained therein to the user. Secured directly to the housing is a cover panel. The clip is preferably secured to the cover panel thereby effectively securing the housing to the user. Moreover, the clip, based upon its position and orientation on the cover panel, is also structured to generally define a top and a bottom of the housing when secured to the user.

Looking further to the cover panel, it is hindedly connected to the housing at generally a bottom thereof, and as a result of this hinged connection, it is structured to be positioned between a closed orientation and an open orientation relative to the housing, while the clip is still secured to the user's person. In use, the housing and the cover panel may be separated, while the clip is secured to the user so as to position the cover panel in the open orientation. While in the open orientation, the display portion and accordingly the display of the portable telephone are exposed to the user in a properly oriented and convenient manner, while the clip maintains the portable telephone case and the portable telephone effectively secured to the user. As a result, if mere viewing of the display is intended by the user, the housing can be further moved to reposition the cover panel in the closed orientation until a future use is desired.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 1 is a front prospective view of a preferred embodiment of the portable telephone case of the present invention;

FIG. 2 is a rear plan view of the embodiment of the portable telephone case as shown in FIG. 1;

FIG. 3 is a rear plan view of another embodiment of the portable telephone case of the present invention;

FIG. 4 is a perspective illustration of the portable telephone case of the present invention containing a portable telephone and being operatively secured to the user;

Like reference numerals refer to like parts throughout the several views of the drawings.

DETAILED DESCRIPTION OF THE PREFERRED EMBODIMENT

Figure 5:
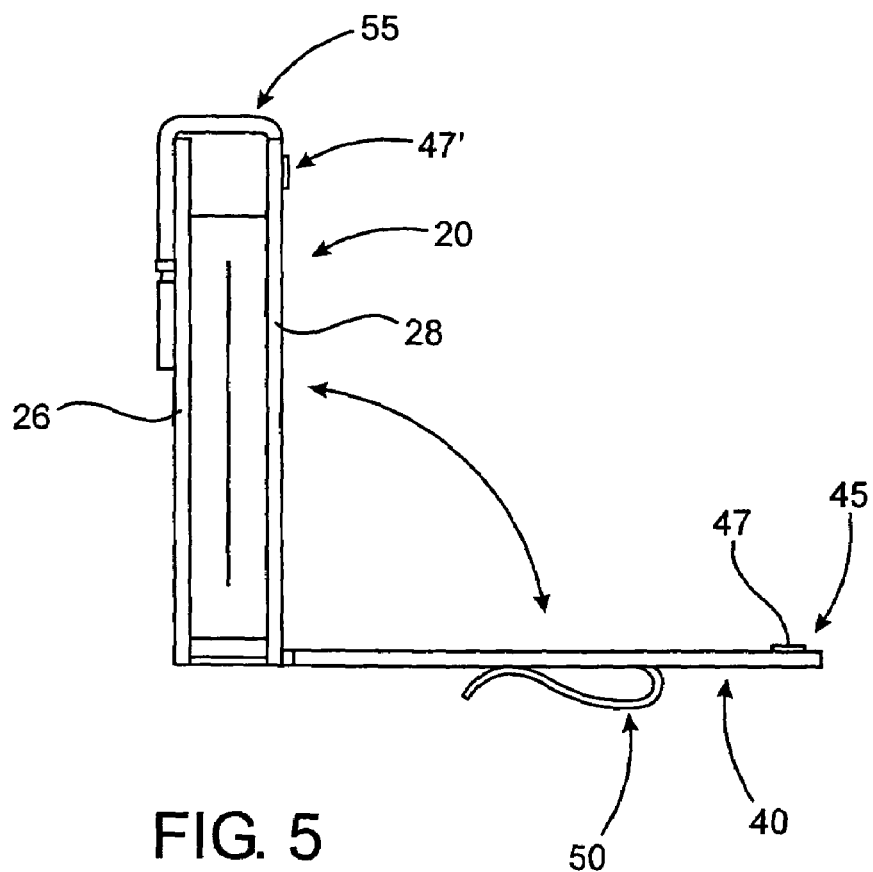
FIG. 5 is a side plan view of one embodiment of the portable telephone case of the present invention.

Shown throughout the figures, the present invention is directed towards a portable telephone case, generally indicated as 10. In particular, the portable telephone case 10 is constructed to contain a portable telephone 70, such as a compact cellular telephone and to effectively protect the portable telephone 70 as well as secure it to the person of a user 60, including an article of clothing or other item such as, but not limited to, a belt 62. Specifically, the portable telephone case 10 of the present invention includes a housing 20. The housing 20 may be formed of any of a variety of materials, such as rubber, leather, plastic, etc. and may be also structured to include a rigid and/or resilient configuration as needed. Moreover, any variety of colors, color patterns, etc. may also be provided including a variety of shapes of the housing 20 necessary to effectively contain the portable telephone. For example, in at least one embodiment of the present invention, it is understood that only a portion of the portable telephone 70 will be contained by the housing 20. However, at least one additional preferred embodiment may comprise the housing 20 being dimensioned and configured, such that substantially the entire portable telephone 70 will be disposed within the housing 20 so as to be effectively shielded. Of course, certain open and/or exposed areas may be included in the housing 20 so as to provide for an appropriate fit with the telephone 70.

With further reference to the housing 20, it may include what may be generally termed as a front 26, a rear 28, a top 22, and a bottom 24. The top 22 and the bottom 24 are preferably defined relative to the positioning and orientation of the mounting assembly 50 as will be described subsequently, and to the manner in which the mounting assembly 50 positions the portable telephone case 10 on the user 60. Moreover, as to the definition of the front 26 and/or rear 28, it is seen that it is also defined relative to the positioning of the portable telephone case 10 in a secured position on the user 60, the portion which is the closest to the user being the rear 28 and the portion which is exterior from the user being the front portion 26. Of course, such characterizations are merely provided for clarity and a single unitary construction may be provided. Moreover, one or more side panels 23 may be provided if desired. These side panels and/or any of the other remaining portions of the housing-20 may provide a partially resilient and/or elastic type of configuration, so as to achieve a snug fit with the portable telephone 70, if desired.

Positioning the portable telephone 70 within the housing 20 may be achieved by passing the portable telephone 70 through one open end or other open portion of the housing 20 as disclosed with the illustrated embodiment. Also, a closure assembly 55 may be provided so as to effectively secure the portable telephone 70 in the housing 20, such as by closing the open end or other open portion through which the cellular telephone 70 passes into the housing 20, as set forth above. In the illustrated embodiments, the opening through which the portable telephone 70 is introduced is in a top portion 22 of the housing 20, although it is understood that a variety of other positions for the opening and/or means to introduce the portable telephone 70 into the housing 20 may be achieved. In this illustrated embodiment, however, the closure assembly 55 may comprise a strap terminating in a latch 56 that is secured to a surface of the housing, such as the front portion 26 of the housing 20 in the illustrated embodiment.

The latch 56 may be of any of a variety of orientations, including a belt type latch, a tie, a clip, a hook and loop fastener, a button, an adhesive, and/or a magnet as in the illustrated embodiment so long as it serves as an effective closure of the housing 20 and accomplishes containment of the portable telephone 70 therein. Moreover, as latch 56 is perfectly disposed on the front portion 26 of the housing 20 when the portable telephone case 10 is secured to a user 60, advertising or like indicia 58 may also be positioned on the latch 56 and/or any other aspect of the front portion 26. Specifically, it may be desirable that advertising, logos, pictorial and/or informational displays, etc. be positioned in a readily visible location, for a variety of reasons, when the portable telephone case 10 is secured to the user 60. Based on the configuration of the present portable telephone case 10, as it will be described, the advertising or other indicia 58 will be effectively visible and will not interfere with and/or otherwise obstruct or hinder the use and/or the visibility of the portable telephone 70 contained within the housing 20.

Permanently defined in a rear portion 28 of the housing 20 is a display portion of 30. Specifically, the display portion 30 is structured to provide visible access to a display 72 of the portable telephone 70 and/or any actuation/function buttons 74 of the portable telephone 70, if needed. Moreover, in a preferred embodiment, the display portion 30 is also structured to provide actuation access to the portable telephone 70 such that the user may not only see the corresponding portions of the portable telephone 70 but may also effectively actuate the buttons 74 and or display 72 as needed for normal operation of the cellular telephone 70. Although the display portion 30 may be defined as an opening in the housing 20, in the preferred and illustrated embodiment, the display portion 30 is preferably defined by an at least partially transparent portion or panel that is included as part of the housing 20. This at least partially transparent panel may define the entire housing 20 and/or the entire rear surface 28 of the housing 20 or, as in the illustrated embodiment, may be provided as a resilient and/or transparent panel that is secured over an opening formed in the housing 20.

Also, if necessary one or more holes or apertures may be provided so as to provide for effective utilization of the speaker and/or microphone of the portable telephone 70, and/or to achieve necessary connections with the portable telephone 70, such as by a removable headset, automobile speaker and/or other battery charger, etc.

Further provided as part of the portable telephone case 10 of the present invention is a cover panel 40. Specifically, a cover panel 40 is preferably structured to be movably secured relative to the housing 20 and can be positioned between an open orientation, as in illustrated in FIG. 4, and/or a closed orientation, wherein the cover panel 40 essentially overlies the display portion 30. In the preferred illustrated embodiment, the cover panel 40 preferably has an at least somewhat rigid configuration and is hingedly connected to the housing 20 at correspondingly positioned edges or other portions thereof. The hinged securement may be by any of a variety of means, including an actual physical metal or other material hinge and/or by means of material stitching between the housing 20 and the cover panel 40.

In the illustrated embodiment the cover panel 40 is secured at generally a bottom 24 of the housing 20, thereby providing for effective relative movement between the housing 20 and the cover panel 40 at generally the bottom edge 42 of the cover panel 40 as a result of the hinge 43. The cover panel 40 is preferably structured to be normally disposed in its closed orientation wherein it overlies and covers and/or conceals the display portion 3.0. When disposed in the open orientation, however, the display portion 30 and accordingly the portable telephone 70 contained within the housing 20 may be readily viewed. In order to maintain the cover panel 40 normally in the closed orientation a fastener 45 is preferably disposed in cooperating engagement between the cover panel 40 and the housing 20. In this regard, it understood that a variety of different fasteners may be provided including straps, latches, clips, adhesives, ties, etc.

Figure 6:
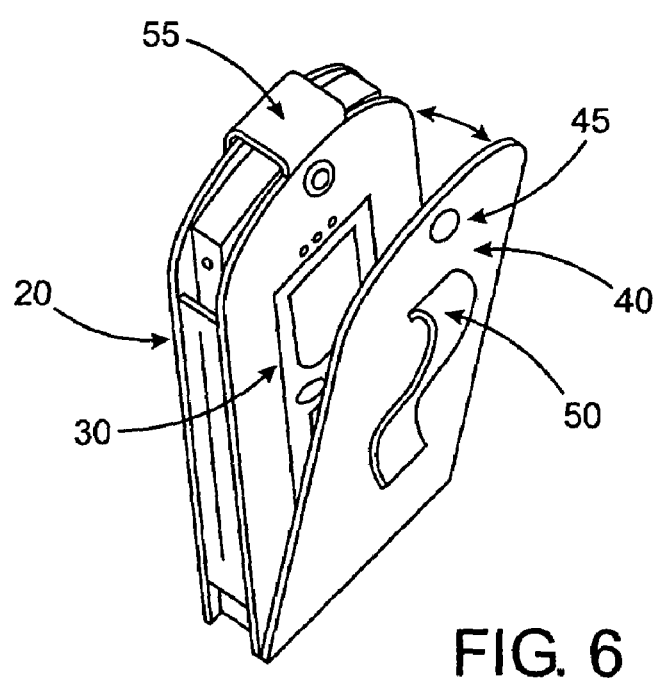
FIG. 6 is a rear perspective view of the portable telephone case of the present invention.

In the preferred, illustrated embodiments of the present invention, however, the fastener 45 will preferably be configured so as to provide for facilitated detachment thereof and facilitated repositioning of the cover panel 40 into its open orientation. For example, in the embodiment in FIG. 1, the fastener 45 may include a hook and loop type fastener configuration 48 disclosed at generally a top of the cover panel 40 and the housing 20. Alternatively, as in FIG. 5, a clip 47, 47' type fastener 45 may be provided. In the illustrated embodiments of FIGS. 4 and 6, however, a magnetized type assembly 46, 46' which can be concealed into the material of the cover panel 40 in the housing 20 is preferably provided. This magnet 46, 46' preferably being sufficiently strong so as to generally maintain the cover panel 40 in its closed orientation unless affirmatively opened by the user as desired.

As previously mentioned, the present portable telephone case 10 further includes a mounting assembly, generally indicated as 50. The mounting assembly 50 is preferably structured to effectively secure the entire portable telephone case 10 to a user 60. In this regard, the mounting assembly may include a belt clip type of structure and/or a belt loop 50' as needed. Moreover, alternative configurations structured to secure the portable telephone case to a belt 62 of the user 60 and/or to another article of clothing such as a pocket, a chain, a strap, etc. may also be provided. As indicated, when the mounting assembly 50 is secured to the user 60, it will generally define the orientations of the top portion 22 and the bottom portion 24 of the housing 50 as disclosed in the accompanying Figures. Of course, it is understood that this top and bottom is defined for a user that is in a vertical and/or standing type of orientation and is merely provided as a point of reference for clarity and explanation. Looking further to the Figures, when use of the portable telephone 70 is not desired, the portable telephone case of the present invention may be effectively clipped and/or secured to the user 60 with the cover panel 40 in a closed orientation. As such only a front portion 26 of the housing 20 is exposed, and any indicia 58 thereon may be effectively viewed. When, however, the user receives a call and/or message, and/or otherwise seeks to access the display 30 of the portable telephone 70, the user must merely move the housing 20 away from the cover panel 40, thus repositioning the cover panel 40 into its open orientation. When this repositioning is achieved, the display portion 30 and therefor the portable telephone 70 are generally vertically exposed such that a user, whether sitting or standing and looking down, can effectively view the portable telephone 70 and more importantly its display 72.

Moreover, the orientation of the display 72 is such that any information displayed thereon is readily visible as needed by the user. However, the user need not remove the portable telephone case 10 and specifically the mounting assembly 50 from its secured position. If the user desires to further utilize the portable telephone 70, the user may then remove the portable telephone case 10 and specifically the mounting assembly 50 from its secured orientation and normally utilize the portable telephone 70 and access the display portion 30 with the cover panel 40 remaining in its open orientation. If, however, no further use of the portable telephone 70 is required, the user may merely return the housing 20 to its adjacent position next to the cover panel 40, thereby returning the cover panel 40 to its closed orientation, the fastener 45 maintaining that secured positioning until future use of the telephone 70 is required. As such, the user need not go through the burden of removing and subsequently re-securing the portable telephone case 10 to the belt 62 and/or other securing locations.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:
1. A portable telephone case comprising:
  a) a housing structured to removably contain a portable telephone at least partially therein;
  b) said housing including a tranparent display portion structured to provide visual access through said housing to a display of the portable telephone removably disposed in said housing;
  c) a mounting assembly structured to be secured to a user;
  d) a cover panel;
  e) said mounting assembly coupled to said cover panel;
  f) said cover panel hingedly secured to said housing and structured to be positioned between a closed orientation overlying said display portion and an open orientation while said mounting assembly is secured to the user;
  g) said open orientation at least partially defined by said housing extending substantially transversely outward from said cover panel while said mounting assembly is secured to the user, and h) said cover panel structured to expose said display portion and accordingly the display of the portable telephone through said housing when in said open orientation.

2. A portable telephone case as recited in claim 1 wherein said display portion comprises an opening in said housing.

3. A portable telephone case as recited in claim 1 wherein said cover panel is hingedly secured to said housing at confronting portions thereof.

4. A portable telephone case as recited in claim 1 wherein said mounting assembly comprises a clip.

5. A portable telephone case as recited in claim 1 wherein said mounting assembly comprises a loop.

6. A portable telephone case as recited in claim 1 wherein said transparent display portion comprises a transparent panel having sufficient flexibility to facilitate actuation access by a user to the portable telephone for operation thereof.

7. A portable telephone case as recited in claim 1 wherein said mounting assembly is structured and disposed to define a top of said housing and a bottom of said housing when secured to the user.

8. A portable telephone case as recited in claim 7 wherein said cover panel is secured to said housing at generally a bottom thereof such that positioning of said cover panel in said open orientation with said mounting assembly secured to the user generally vertically exposes said display portion and the display of the portable telephone to the user.

9. A portable telephone case as recited in claim 8 further comprising a fastener structured to removably secure said cover panel normally in said closed orientation.

10. A portable telephone case as recited in claim 9 wherein said fastener comprises a magnetic fastener correspondingly disposed on said cover panel and said housing.

11. A portable telephone case as recited in claim 9 wherein said fastener comprises a hook and loop fastener correspondingly disposed on said cover panel and said housing.

12. A portable telephone case as recited in claim 9 wherein said fastener comprises a snap fastener correspondingly disposed on said cover panel and said housing.

13. A portable telephone case as recited in claim 1 wherein said housing comprises a closure assembly structured to secure the portable telephone in said housing.

14. A portable telephone case as recited in claim 13 wherein said housing comprises an open portion disposed and dimensioned to facilitate passage of the portable telephone into and out of said housing; said closure assembly cooperatively disposed and structured to restrict passage of the portable telephone through said open portion.

15. A portable telephone case as recited in claim 14 wherein said closure assembly comprises a closure latch structured to be secured to a surface of said housing opposite said cover panel so as to be visible when said mounting assembly secures said housing to the user.

16. A portable telephone case as recited in claim 15 wherein said closure latch comprises an outer surface dimensioned and configured to display indicia thereon.

17. A portable telephone case comprising:
 a) a housing structured to contain the portable telephone at least partially therein;
 b) said housing including a transparent display portion structured to provide visible access through said housing to a display of the portable telephone disposed in said housing;
 c) a mounting assembly structured to be secured to a user;
 d) a cover panel secured to said housing;
 e) said mounting assembly disposed on said cover panel and structured to define generally a top and a bottom of said housing when secured to the user;
 f) said cover panel and said housing hingedly interconnected adjacent a bottom of said housing, said cover panel structured to be positioned between a closed orientation overlying said display portion and an open orientation while said mounting assembly is secured to the user; and
 g) said open orientation at least partially defined by said housing extending substantially transversely outward from said cover panel while said mounting assembly is secured to the user so as to expose said display portion and accordingly the display of the portable telephone through said housing to the user.

18. A portable telephone case as recited in claim 17 wherein said mounting assembly comprises a clip.

19. A portable telephone case as recited in claim 17 wherein said transparent display portion comprises a transparent panel having sufficient flexibility to facilitate actuation access by a user to the portable telephone for operation thereof.

\* \* \* \* \*

UNITED STATES PATENT AND TRADEMARK OFFICE
CERTIFICATE OF CORRECTION

PATENT NO. : 7,099,710 B1  Page 1 of 1
APPLICATION NO. : 10/337223
DATED : August 29, 2006
INVENTOR(S) : Gabiel Faillace It is certified that error appears in the above-identified patent and that said Letters Patent is hereby corrected as shown below:

On Title Page, Item (76) Correct the misspelling of the Applicant's last name in the Patent Letter to read --Faillace-- instead of "Faillace".

Signed and Sealed this

Fifth Day of December, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,099,710 B1 | Page 1 of 1 |
| APPLICATION NO. | : 10/337223 | |
| DATED | : August 29, 2006 | |
| INVENTOR(S) | : Gabriel Faillace | |

It is certified that error appears in the above-identified patent and that said Letters Patent is hereby corrected as shown below:

On Title Page, Item (76) Correct the misspelling of the Applicant's last name in the Patent Letter to read --Faillace-- instead of "Faillance".

This certificate supersedes Certificate of Correction issued December 5, 2006.

Signed and Sealed this

Thirty-first Day of July, 2007

JON W. DUDAS
*Director of the United States Patent and Trademark Office*